United States Patent [19]

Lahde et al.

[11] 3,710,086
[45] Jan. 9, 1973

[54] SERVO SYSTEM EMPLOYING SWITCHING TYPE FEEDBACK

[75] Inventors: Reinhard N. Lahde, Los Altos; Alex Pawelek, Granada Hills, both of Calif.

[73] Assignee: Lockheed Aircraft Corporation, Los Angeles, Calif.

[22] Filed: Feb. 5, 1970

[21] Appl. No.: 8,934

[52] U.S. Cl. ............235/150.2, 235/183, 244/3.1, 244/3.21, 244/77 G, 318/580, 318/585
[51] Int. Cl. ................................................G06g 7/70
[58] Field of Search........235/183, 150.2, 21, 22, 23; 244/3.1, 3.21, 77 DZ, 77 G, 77 SS; 318/561, 564, 580, 585, 596, 609, 610, 611, 612, 615, 616, 620, 624, 625, 672

[56] References Cited

UNITED STATES PATENTS

| | | | |
|---|---|---|---|
| 3,366,856 | 1/1968 | Sawano | 318/615 X |
| 3,227,935 | 1/1966 | Kawada | 318/620 X |
| 3,412,960 | 11/1968 | Kocher et al. | 244/77 DZ |
| 3,274,552 | 9/1966 | Harmon et al. | 235/150.2 X |

OTHER PUBLICATIONS

Hiltz: Adaptive Autopilot from Aerospace Electronics, Sept. 1960; Vol. 34, p. 130–134.
McLaren: A Gas-Jet Altitude-Control System. Control, Sept., 1964, Vol. 8, p. 446–450.

*Primary Examiner*—Felix D. Gruber
*Attorney*—George C. Sullivan and Ralph M. Flygare

[57] ABSTRACT

The invention provides a servo control system, capable of either a continuous or discontinuous operating mode, which utilizes sign-switched integration circuit to obtain extremely fast response under an unusually wide range of operating conditions. Two internal feedback quantities are employed, one of which comprises the output control signal and the other of which is the output of an integrator whose input is connected to a circuit element which generates a positive or negative value of the first time derivative of the output control signal and whereby the sign of this first time derivative is made dependent upon variables of the system. The application of the invention to a spacecraft navigation system is described.

10 Claims, 7 Drawing Figures

FIG. 1

INVENTORS
REINHARD N. LAHDE
ALEX PAWELEK

By George C. Sullivan
Agent

FIG_2

FIG_3

INVENTORS
REINHARD N. LAHDE
ALEX PAWELEK
BY George C Sullivan
Agent

FIG_4

FIG_5

INVENTORS
REINHARD N. LAHDE
ALEX PAWELEK

BY George C. Sullivan
Agent

SERVO SYSTEM EMPLOYING SWITCHING TYPE FEEDBACK

BACKGROUND OF THE INVENTION

Various types of "on-off" or switching-type of servo control systems have been proposed heretofore. Systems of this type find a unique contemporary application as attitude and maneuvering control systems for missiles and spacecraft, since these vehicles are unusually demanding in terms of economy and performance. These prior systems, sometimes referred to as "bang-bang" systems, while superior in many respects to proportional-type control systems, have suffered from a number of deficiencies such as undesirable damping, steady-state error, and response time lag. These deficiencies of prior switching-type systems are overcome by the present invention which employs an auxiliary feedback voltage utilizing sign-switched integration. The system of the present invention may be broadly classified as a control of the "bang-bang" type in which off-on or discrete switching is employed as compared with continuous proportional control.

In servo control systems, employing feedback, it is customary to use system output and/or system error for dynamic stabilization. If the system is linear, a first derivative or a combination of first and higher order derivatives of system output and/or system error is often used. The present invention is based upon a concept of time-switched integration and is applicable to both linear and certain types of non-linear control systems.

SUMMARY OF THE INVENTION

Summarizing, the invention comprises a novel and improved servo control utilizing a switching-type feedback method and sign-switched integration, to obtain extremely fast response, and which will operate effectively under an unusually wide range of conditions.

The switching logic of the invention may be termed "conditional switching". This technique provides for the generation of an auxiliary feedback voltage through integration of the first and/or higher derivatives of the function to be controlled, for example the angular attitude of a spacecraft as may be represented by a DC voltage proportional to said attitude, whereby the sign of the signal representing said function to be integrated is reversed at certain times depending on system condition. One basic property of the auxiliary feedback voltage is that it becomes zero when a signal proportional to the rate of the controlled variable is zero. The system of the invention provides an increase in the speed of response as compared with prior systems, and in certain practical constructions the attainable response time is very close to the fastest response theoretically possible or achievable within the limitations of available power in the system.

To facilitate teaching the principles of the invention its application to a single-degree-of-freedom attitude and maneuvering control system, employing off-on, constant-thrust reaction jets, for a space vehicle will be described hereinafter.

By comparison with existing methods of discontinuous control, the time-switched integration system of the present invention provides greater system simplicity, faster response, and improved economy of the energy controlled by the system. Further, it is unusually flexible and can be adapted to a variety of control situations, as will become apparent hereinafter. Also, in certain embodiments, using actual sensor information, the system is "self-adaptive" in the sense that feedback gains are unity and independent of discrete or slow time (as compared with one response cycle) changes of control acceleration.

In contrast to proportional systems, switching-type control systems achieve their accuracy of control by the timing accuracy of the switching pulses, in addition to the accuracy of the level of constant acceleration applied. Obviously with a given timing error, the total system error will increase with the number of switching operations occurring per unit time. Therefore, the frequency of switching should be kept as low as is compatible with other dynamic control requirements.

Of the prior systems mentioned above, pulse modulation is one of the oldest methods of discontinuous control. Pulse modulation systems of switching logic may be considered as a linearization of the pulse system in that a quasi-proportional signal is generated in the circuit by a sequence of plus, zero, and minus pulses which are timed such that an effective average level is produced equivalent to a proportional signal. One important design aspect of such a system is the switching frequency. The lowest frequency permissible is limited by undesirable system response to the cycling. Very often, an undesirably large and random time-lag occurs if the cycling does not respond to sudden changes of input. For example, if a strong pulse-input arrives at a time when the pulse modulator is in the minus cycle, or off cycle, system response may lag the input signal by a substantial portion of the pulse repetition time. To avoid this disadvantage, the switching logic of a system should be such that a signal which exceeds the system deadband penetrates directly to the decision element for immediate action. The present invention provides a novel method and means for achieving this objective. Additional objectives will become apparent hereinafter.

A principal object of the invention is to provide a novel and improved servo system employing switching-type feedback.

Another object of the invention is to provide a novel and improved servo system of the discontinuous control type.

Yet another object of the invention is to provide a novel and improved servo control system employing feedback which utilizes time-switched integration.

It is yet another object of the invention to provide a novel and improved attitude and maneuvering control system for space vehicles.

Still another object of the invention is to provide novel and improved means for obtaining an auxiliary feedback voltage utilizing sign-switched integration for the purpose of controlling a servo system.

A general object of this invention is to provide a novel and improved servo control which overcomes disadvantages of previous means and methods heretofore intended to accomplish generally similar purposes.

Other objects of the invention will in part be obvious, and will in part appear hereinafter.

Many other advantages and features of the present invention will become manifest to those versed in the art upon making reference to the detailed description which follows and the accompanying sheets of drawings in which preferred structural embodiments incorporating the principles of the present invention are shown by way of illustrative example.

DETAILED DESCRIPTION OF THE EMBODIMENTS SHOWN

To facilitate exposition of the invention its application to an attitude control system will first be described. In this application the reaction jets are operated with constant thrust in an on-off fashion. For the sake of simplicity the system under consideration has been limited to the single-degree-of-freedom case and to vehicles operating outside the atmosphere; i.e., the vehicle controlled has no natural damping and no aerodynamic stability.

Inasmuch as each of the functional units represented by a block in the figures may be any one of the numerous devices for each respective function well known in the art, it is deemed unnecessary to show circuit details.

Heretofore, the implementation of switching-type control systems for use with reaction motors have employed mechanical components for valving fuel into the reaction motors. In these prior systems, relays have been used employing electrical contacts for switching power to solenoids which in turn open and close the fuel valves. More recently electro-mechanical relays have been replaced with their solid-state equivalents. To facilitate exposition of the present invention and to simplify the switching logic, the discussion which follows employs diagrams and circuits including numerous relays. It should be understood, however, that practical implementation of such switching systems, for a spacecraft would in most instances employ solid-state equivalents of the relays shown. Regarding switching logic design there are two main considerations: performance and weight economy. It is quite obvious that in order for a switching-type control system to be economical of fuel it must use long "off" cycles whenever possible, and should never rapidly switch from plus to minus acceleration. Any system optimization involves a tradeoff between economy and performance which depends on a number of heterogeneous operational and mission parameters.

The present invention is, in broadest terms, a feedback system. Feedback systems of the type to which the present invention belongs may also be referred to as race-brake systems and such systems may be designed for maximum performance, i.e., fastest response, by taking maximum advantage of the capabilities of a switching-type control regardless of input level. Assuming that the input is a step input, systems of this type will accelerate towards diminishing error with full acceleration until arriving at a point where the combination of error remaining and the system rate is such so as to require full deceleration in order to come to a stop at zero error, provided that the input has not changed during the braking period. The optimum response of such a system need not be restricted to step inputs. That is, the system also responds in an optimum way to a ramp input in that regardless of the steepness of the ramp input signal, the system output achieves a rate equal to that of the ramp in the shortest time compatible with the system's power limitation. Prior systems of this general type have a velocity error, however, like other control systems. For example, linear systems have velocity errors unless error integration is used. Error integration can also be applied to the race-brake systems as well as to the system of the present invention.

Figure 1:
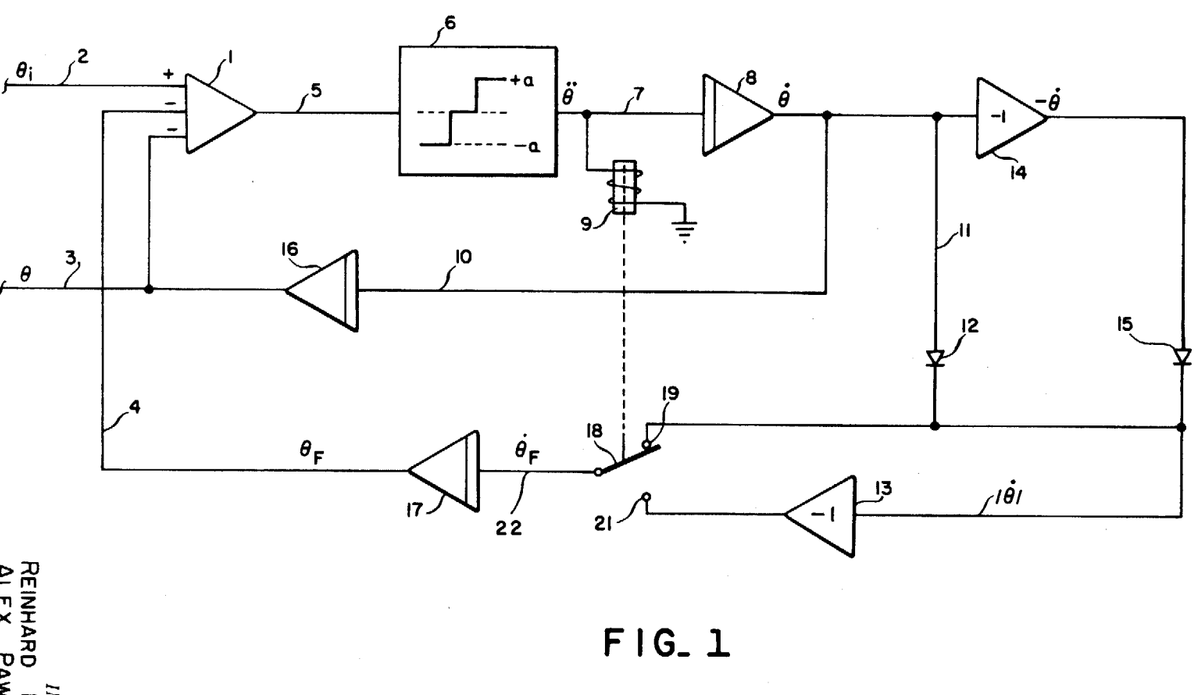
FIG. 1 is a block diagram of a servo control system of the type employing time-switched integration.

The system now to be described may be referred to as a time-switched integration system. The system is shown in FIG. 1 and has a decision amplifier 1 where the input $\theta_i$ on line 2 is compared with two feedback voltages $\theta$ and $\theta_F$ on lines 3 and 4, respectively, one being the system output, i.e., $\theta$, the other one here termed auxiliary feedback voltage $\theta_F$. The output of decision or adding amplifier 1 appears on line 5 and is supplied to switching element 6. Switching element 6 has a specified deadband and is so constructed that when the input signal amplitude exceeds the deadband, the output $\ddot{\theta}$ on line 7 assumes a value of $+\alpha$ or $-\alpha$ depending on the algebraic sign of the input on line 5. The output signal $\ddot{\theta}$ is supplied to both integrator 8 and to polarized relay 9. The integrated output from integrator 8 appears on line 11 and is supplied via diode 12 to amplifier 13, and via amplifier 14 and diode 15 to amplifier 13. Amplifiers 13 and 14 are inverting unit gain amplifiers.

Integrator 16 is connected to the output of integrator 8 via line 10 and therefore integrates vehicle rate of produce vehicle attitude $\theta$ on line 3. to input to integrator 17 is obtained via relay arm contact 18. Relay contact 19 is supplied from diodes 12 and 15, and relay contact 21 is supplied from the output of amplifier 13.

System operation is best understood by assuming a step input on line 2. The system performs an acceleration towards decreasing error. During this cycle, the auxiliary voltage $\theta_F$ on line 4 is developed by integrating attitude rate and, therefore, equals the voltage representing system attitude $\theta$ on line 3. This is because 18 is connected to contact 19 which carries a voltage equivalent to $|\dot{\theta}|$ and since $\dot{\theta}$ is positive, $|\dot{\theta}|$ equals $\dot{\theta}$. The two voltages (on lines 3 and 4) therefore add up at the decision amplifier 1 to produce twice the effect on the output 5. This has the consequence of zeroing the decision amplifier 1 when the system has travelled an amount equal to one-half of the original step error. At this time, the decision amplifier output (5) becomes slightly negative and the braking cycle begins, because relay coil 9, now obtaining negative voltage, causes arm 18 to travel to contact 21. This switching action reverses the sign of function $\theta_F$, which is the input to integrator 17 which generates $\theta_F$. This has the consequence that the sum of the output $\theta$ plus $\theta_F$ remains constant during the braking period by keeping the decision amplifier output (5) slightly negative and maintaining negative accelerations until system error and error rate vanish simultaneously.

For a full understanding of the operation of the system it is helpful to also consider a negative step input on line 2. In this case, the decision amplifier 1 and the switching element 6 become negatively biased and relay coil 9 causes contact 18 to move to contact 21. Because of the negative system acceleration, a negative feedback voltage develops on line 3. This voltage is fed into the decision amplifier 1 with an opposite sign, i.e. it opposes the negative step input voltage on line 2. Simultaneously, a negative auxiliary voltage $0_F$ is developed on line 4 by integrating a negative value of the absolute attitude rate, because contact 18 is connected to contact 21 which, through the action of sign reversing, unity gain amplifier 13 carries a negative value of the absolute attitude rate developed on line 19. The two voltages on line 3 and 4, being both negative, add up at the decision amplifier 1 to produce twice the effect on the output 5. This again has the effect of zeroing the decision amplifier 1 when the system has travelled an amount equal to one-half of the original negative step input. At this time, the combined action of the two negative feedback voltages which enter the decision amplifier 1 with an opposite sign, i.e. as positive voltages, become larger than the negative input voltage, which causes the output of the decision amplifier 1, i.e., line 5, to carry a slightly positive voltage. At this time, the relay coil 9 causes arm 18 to move to contact 19, thereby making the input to integrator 17 positive. At the same time, the system acceleration, i.e. line 7, has become positive indicating that the braking cycle has begun. Now, consider that line 10 carries a voltage of the same magnitude, but of opposite sign, as line 22. Both voltages are integrated and combine at the decision amplifier 1. As a result, the sum of the output 0 plus $0_F$ remains constant during the braking period and keeps the output of the decision amplifier 1 slightly positive, which in turn maintains positive system acceleration until system error and error rate simultaneously become zero.

It is, of course, easily possible to introduce a deadband for fuel saving, as indicated in FIG. 1, but which so far had not been considered in the explanation of the functioning of the circuit. If the deadband is denoted as $\pm 0_D$ and the relay 9, 18, 19, 21 is so constructed that whenever the absolute value of the output of decision amplifier 1, i.e. the voltage on line 5, is smaller than the deadband voltage, the arm 18 will be positioned midway between 19 and 21, i.e., zero voltage will be fed into the integrator 17. With these stipulations the control laws governing the operation of this system are as follows:

$$\ddot{\theta} = a \operatorname{sign} F \quad \text{if } |F| > 0_D$$

(1)

$$\ddot{\theta} = 0 \quad \text{if } |F| < 0_D$$

(2)

$$F = \theta_i - \theta - \theta_F$$

(3)

$$\dot{\theta}_F = \dot{\theta} \operatorname{sign} \ddot{\theta} \quad \text{if } \ddot{\theta} = \pm a$$

(4)

$$\dot{\theta}_F = 0 \quad \text{if } \ddot{\theta} = 0$$

(5)

$$\theta_F = 0 \text{ whenever } \dot{\theta} = 0$$

(6)

$a$ is the system's acceleration capability, a constant value.

As can be seen, an advantage of this switching logic is that no multiplication need be implemented. Also, both feedback signals, $\theta$ and $\theta_F$ have unity gain; hence optimal system operation is maintained even in the presence of changes of the system's acceleration capability $a$, as long as the change is sufficiently slow such that the acceleration during the first half of a cycle in response to a step input signal is not significantly different from the deceleration during the second half of that cycle.

As noted above, an important feature of this system is that no multiplication is necessary in the switching logic, thus simplifying the system. A more important feature is the fact that the feedback gain does not contain a scale factor; therefore, the feedback gain is unity, and this feature is maintained even in the presence of slow changes of level of the system acceleration. It is therefore justified to term the system "adaptive". This feature is of particular importance for spacecraft attitude control systems where the decrease in vehicle mass due to fuel consumption tends to progressively decrease the moment of inertia and hence increase the angular acceleration capability of the reaction control system used for attitude control.

One of the characteristics of the auxiliary feedback voltage $\theta_F$ is that mathematically it must be zeroed whenever the system output rate is zero. This property holds for all modifications of the system which, as will be discussed later, may include deadband, proportional "off" time, velocity limitation, etc. Obviously, to practically maintain this feature would require the integrator which produces $\theta_F$ not to have any drift. A simple zeroing circuit may be employed to zero the output of the critical integrator whenever the system rate goes through zero, thereby making the drift requirement for the integrator very moderate.

The time-switched integration system is very flexible in that it can be adapted to many additional operational requirements. A few exemplary modifications will be discussed hereinafter. The introduction of a deadband is very simple and merely involves a zone of insensitivity in the main decision amplifier and is done in the same manner as with conventional systems. The only additional feature which must be provided in the circuit whenever "off" times are involved is that the input of the integrator generating the auxiliary feedback voltage must be zeroed for any period of zero system acceleration.

Figure 2:
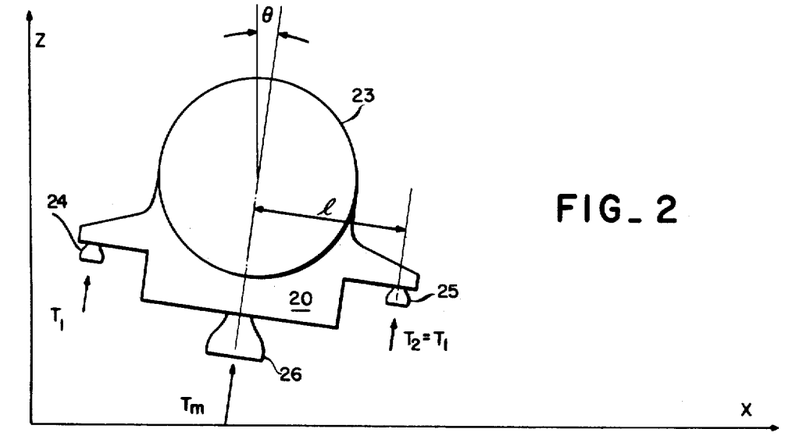
FIG. 2 illustrates, in diagrammatic form, a simple attitude and maneuvering control system of a space vehicle.

There is shown in FIG. 2 an attitude and manuevering control system 20 for a spacecraft 23 hovering at a given location. The control system employs reaction jets 24 and 25 which can be controlled only for zero or full thrust, hence an angular acceleration $\ddot{\theta}$ of the spacecraft 23 can be obtained having only three possible values, zero, plus $a$, or minus $a$, where $a$ is the angular acceleration capability of the system, i.e. $a = TL/I$. The term $I$ is the moment of inertia of the vehicle about its center of gravity and the axis of rotation concerned. It is further assumed that the main thrust, $T_m$ obtained from jet 26 is controlled to counteract the weight of the vehicle so as to maintain constant altitude.

Figure 3:
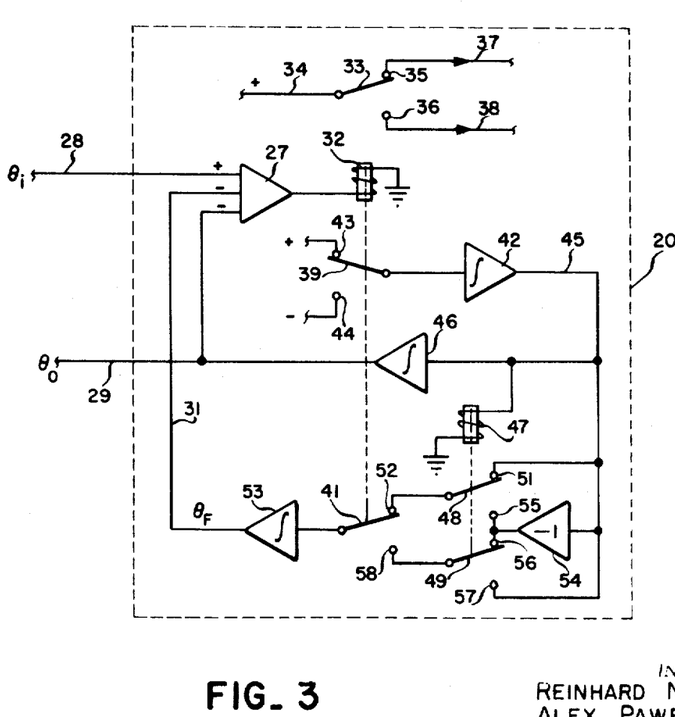
FIG. 3 is a block diagram of a simplified embodiment of the invention.

FIG. 3 is a block diagram of the attitude control system 20 for spacecraft 23 which utilizes the feedback method and apparatus of the invention. In the embodiment of FIG. 3, the sign of amplifier 27, corresponding to decision amplifier 1 of FIG. 1 determines whether plus or minus acceleration is to be applied. In the interest of simplicity, the "deadband" is disregarded, which in practice would be introduced for zero command. Relay 32 and contacts 39, 43 and 44 correspond to the "switching element" 6 of FIG. 1. A pitch attitude command $\theta_i$ is applied on input line 28.

The fastest possible way for the spacecraft 23 to respond to a step input command ($\theta_i$) of attitude would be to apply positive acceleration until one-half of the desired attitude change has been achieved, then switch to minus acceleration for an equal amount of time and then zero the system. In order to accomplish this automatically, amplifier 27 receives two feedback voltages, termed $\theta_0$ (on line 29) and $\theta_F$ (on line 31). The signal $\theta_0$ is the actual attitude of the vehicle, appearing as a voltage signal; $\theta_F$ is the auxiliary feedback voltage in accordance with the method of the invention. It is obtained by integrating attitude rate but, switching sign of integration when the system switches the sign of the angular acceleration.

The output of decision amplifier 27 is used to energize the polarized relay coil 32. Arm contact 33 is actuated by relay coil 32 and serves to switch a positive voltage, supplied on line 34 from any suitable source, to either contact 35 or 36. When the output of 27 is positive, as shown in FIG. 3, contact 35 is closed and power will be supplied on line 37 to turn on jet 24 of the spacecraft 23 (see FIG. 2). When contact 36 is closed, power will be applied to line 38 causing jet 25 to be turned on.

Relay coil 32 also operates arm contacts 39 and 41. Arm contact 39 will apply a positive voltage to integrating amplifier 42 when closed to contact 43, and will supply a negative voltage to amplifier 42 when closed to contact 44. The output of integrating amplifier 42 is supplied on line 45 to the input of integrating amplifier 46 and also to relay coil 47.

The relay 47 with the contact arms 48, 49 and the contacts 51, 55, 56, 57 and the inverting unity gain amplifier 54 constitutes an alternate way of generating the absolute value of $\dot{\theta}$ on contact 52, and its negative value at 58. In FIG. 1, the absolute value of $\dot{\theta}$, and its negative value was generated instead by means of the rectifiers 12 and 15 and the inverting unity gain amplifier 13, whereby the relay switch 18, 19, 21 of FIG. 1 corresponds in FIG. 3 to the relay switch 41, 52, and 58. Otherwise, the circuit of FIG. 3 and its functioning is the same as that of FIG. 1.

As can be seen in FIG. 3, three voltages are fed into amplifier 27. During the first half of the cycle, the sum of two feedback voltages, $\theta_0 + \theta_F$ (appearing on lines 29 and 31 respectively), rises sharply to equal the input at the proper time for switching. At this time, the output of amplifier 27 becomes zero (actually slightly negative to get out of the deadband); during the second half of the cycle, the sum of the two feedback voltages is a constant value, and therefore minus acceleration is applied during this cycle. At completion of the cycle, the auxiliary feedback voltage $\theta_F$ has decayed to zero, and the position feedback voltage $\theta_0$ matches the input $\theta_i$. The system is now in the same state of readiness for another command as it was at the beginning of the step input.

The voltage applied to the integrating amplifier 42 via arm 39 contact 43 and 44 represents the vehicle's angular acceleration. In practical construction this voltage should be made proportional to the actual vehicle acceleration which might be subject to changes, for example due to the change of the vehicle's moment of inertia (fuel consumption, staging), or because of intentional switching of the force level of the vehicle's attitude control system. For example, the input of the integrator 42 could be connected to the output of a vehicle mounted angular accelerometer. This would ensure proper functioning of the circuit even under greatly varying angular acceleration capability of the vehicle and thus the system could be termed adaptive.

The feedback method employed in the above-described system may be summarized as follows:

A decision amplifier (27) receives an input command plus two feedback voltages, one being the quantity to be controlled, the other, called auxiliary feedback being obtained by integrating the first derivative of the control function but reversing the sign of the integration when the output of the decision amplifier changes its sign. This method of obtaining the auxiliary feedback voltage is referred to as "sign-switched integration".

The method of the invention may further be illustrated by another example for obtaining "velocity over ground" control. Referring again to FIG. 2 the objective is now to convey to spacecraft 23 a desired velocity over the ground. Since thrust is maintained to keep the altitude of the spacecraft constant, tilting the spacecraft generates a longitudinal acceleration, $\ddot{x}$ which is equal to gravity multiplied by the tangent of pitch angle or, for small tilt angles simply proportionate to that angle.

Figure 4:
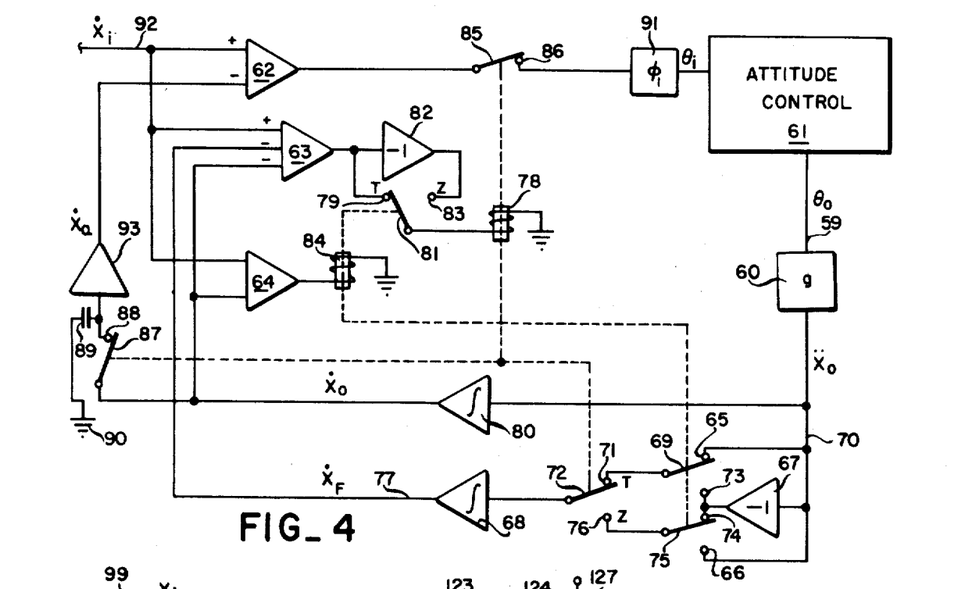
FIG. 4 is a simplified block diagram of an embodiment of the invention for implementing velocity control.

FIG. 4 is a block diagram of apparatus for implementing velocity control in accordance with the invention. The block identified as attitude control 61 corresponds to the control system 20 shown in FIG. 3. Decision amplifiers 62–64 are utilized in the circuit to generate switch positions T or Z, depending on the signs of their output. Amplifier 63 is the main decision element, (corresponding to amplifier 27 in FIG. 3), i.e., it receives the three feedback voltages as explained in the previous case. In this case, the auxiliary voltage $\dot{x}_F$ is obtained by "sign switched" integration of $\ddot{x}_0$.

The output of the attitude control 61 is supplied to multiplier (potentiometer) 60 which applies a gravity factor to the vehicle attitude control signal $\theta$ on line 59 to give the output signal $\ddot{x}_0$ on line 70. The signal on line 70 is supplied to integrating amplifier 80 and also to relay contacts 65 and 66. This signal is also supplied to sign changing amplifier 67. Additionally, the signal $\dot{x}_0$ is supplied to integrating amplifier 68 via contact 65, arm contact 69, contact 71, and arm contact 72, when the switch position T exists. The sign of the signal is reversed via sign changing amplifier 67, and appears at contacts 73 and 74. Alternate logic for the Z switch position is provided via contact 74, arm contact 75, and contact 76. The feedback voltage $\dot{x}_F$ from integrating amplifier 68 is supplied to main decision amplifier 63 on line 77. The output of main decision amplifier 63 energizes relay coil 78 via contacts 79 and 81 in the T switch position, and via sign changing amplifier 82 and contact 83 in the Z switch position. The T or Z switch positions are controlled by relay coil 84 which in turn is energized by the output of decision amplifier 64.

Relay coil 78 operates switch contacts 85-88 as well as contacts 71, 72 and 76. The velocity command signal on line 92 is sent via contacts 85 and 86 to the input of attitude control 61 via limiter 91 where it appears as a voltage representing attitude. An additional feature of the invention is the ability to limit the maximum tilt angle and thus the maximum acceleration over the ground, i.e., the first derivative of the function to be controlled. This circuit (91) automatically limits the maximum tilt angle of the spacecraft to some predetermined value, say 40°. The feedback signal $\dot{x}_0$ is supplied to decision amplifier 62 via unity gain amplifier 93 and contacts 87 and 88. This signal $\dot{x}_0$ also appears across capacitor 89 which is referenced to ground 90.

The reason why this circuit is slightly more complicated as compared with the one in FIG. 3 is that the response characteristic of quantity-to-be-controlled, as a function of an input into the attitude control 61 is different. The principle of operation of this circuit is as follows: A step input $x_i$ from the pilot's control stick generates an unbalance in amplifier 63, causing contacts 85 and 86 to close, contacts 87 and 88 to open, and 72 to go to T (71). This puts the step input voltage at the input of the attitude control 61 where it is translated into an attitude command. The spacecraft goes through the cycling of its reaction control system in accordance with the mechanics of the circuit FIG. 3 and achieves the desired pitch angle precisely at the time, when one half of the commanded speed over ground is achieved. At this time, in accordance with the feedback principle of the invention, the output of amplifier 63 changes sign, causing contacts 85–86 to open, contacts 87–88 to close, contact 72 to go to Z (76). Now, the attitude control 61 sees a zero command and causes the vehicle attitude to return to zero. At the same time, the achieved velocity, i.e., a voltage representing same, respectively, is applied to amplifier 62 via contacts 87–88. After completion of the cycle, the spacecraft has achieved the commanded velocity, i.e., output of amplifier 62 is zero. Output of amplifier 63 is likewise zero, since in accordance with the method of feedback of the invention, $\dot{x}_F$ has also integrated back to zero. The system is now again in a state of readiness for another command.

As can be seen from the foregoing example, the time-switched integration method of the invention is not restricted in application to single-degree-of-freedom attitude control. The higher order control task performed by the apparatus of FIG. 4 permits maneuvering during the hovering period by tilting the spacecraft around one of two perpendicular horizontal axes, thereby generating sidewise accelerations equal to gravity acceleration multiplied by the tangent of the tilt angle $\theta$. The apparatus of FIG. 4 comprises only one axis. The input signal $\dot{x}_1$ may be derived from a pilot's control stick. Upon deflection of the control stick, the system automatically goes through a series of acceleration and deceleration maneuvers which establish the command velocity over the ground in the shortest possible time compatible with system angular acceleration capability and the maximum permitted tilt angle.

In explaining the principle of feedback of the invention, a step input has been assumed in both examples, and the cycling of the circuit has been followed until the spacecraft's output matched the input command. It should be understood, however, that the system is capable of appropriate operation for inputs other than step inputs or in case a new step input is applied to the system on top of the old one, before the system has had time to complete its cycle in response to the first input. In all cases, the system is capable of generating the fastest vehicle response compatible with the basic limitation of the reaction control system.

Figure 5:
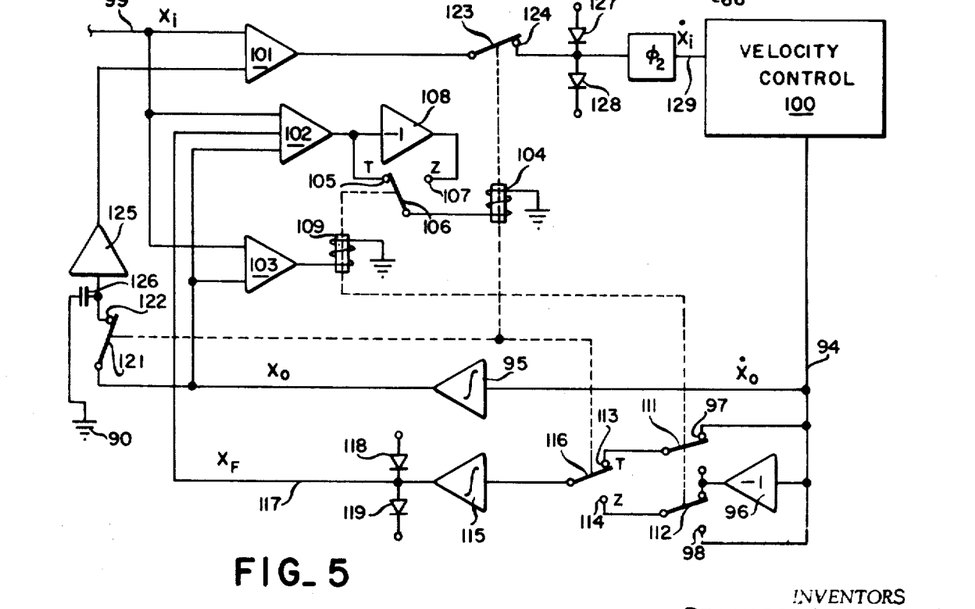
FIG. 5 is a simplified block diagram of a horizontal distance control embodiment of the invention.

The method of feedback in accordance with the invention is not restricted to the two examples of FIGS. 3 and 8. FIG. 5 is another embodiment of the invention, using the same principle, for control of horizontal distance of a space vehicle. This embodiment also illustrates an additional feature possible with the present invention. If it is desired to place a limitation on the magnitude of the first derivative of the quantity to be controlled, then this limitation can be obtained by the circuit shown in FIG. 5 wherein the quantity to be so limited is velocity over ground. In this case it is shown to be limited to 50'/second. This requires the voltage limiting devices (127 and 128) shown in front of function $\phi_2$ and after (118 and 119) the integrator 115, generating $x_F$. In this case, block 100 corresponds to the velocity control circuit shown in the schematic of FIG. 4.

The remainder of this circuit is substantially the same as the circuit of FIG. 4. However, this circuit does not include the gravity factor element but is additionally provided with the limiters mentioned hereinabove. The output of velocity control 100 is supplied via line 94 to integrating amplifier 95, sign changing amplifier 96, and contacts 97 and 98. The input command is supplied on line 99 to decision amplifiers 101, 102 and 103. The output of decision amplifier 102 controls relay coil 104, via contacts 105 and 106 in the T switch position, and via contacts 106 and 107 in the Z contact position, by way of sign changing amplifier 108. Arm contact 106 is controlled by relay coil 109 which in turn is energized by the output of decision amplifier 103. Relay coil 109 also operates contacts 111 and 112 which transfer the feedback signal to contacts 113 and 114. Integrating amplifier 115 receives its input signal via contact 116, and its output appearing on line 117 is limited by clamp diodes 118 and 119 which are connected to a suitable reference voltage source (not shown). The output signal on line 117 is the feedback signal $x_F$ and in a typical construction may have its amplitude limited by diodes 118 and 119 to correspond to a maximum of ± 200', i.e., the stopping distance when travelling at a steady state with a maximum velocity of 50'/second.

Relay coil 104 operates contacts 116, 121–124. The feedback signal $x_0$ is supplied via contacts 121 and 122 to unity gain amplifier 125 and to capacitor 126.

The output signal from amplifier 101 is limited via diodes 127 and 128 prior to being fed to velocity control 100. Limiting diodes 127, 128 limit the maximum velocity to ±50'/second. The signal on line 129 corresponds to $\dot{x}_t$.

Figure 6:
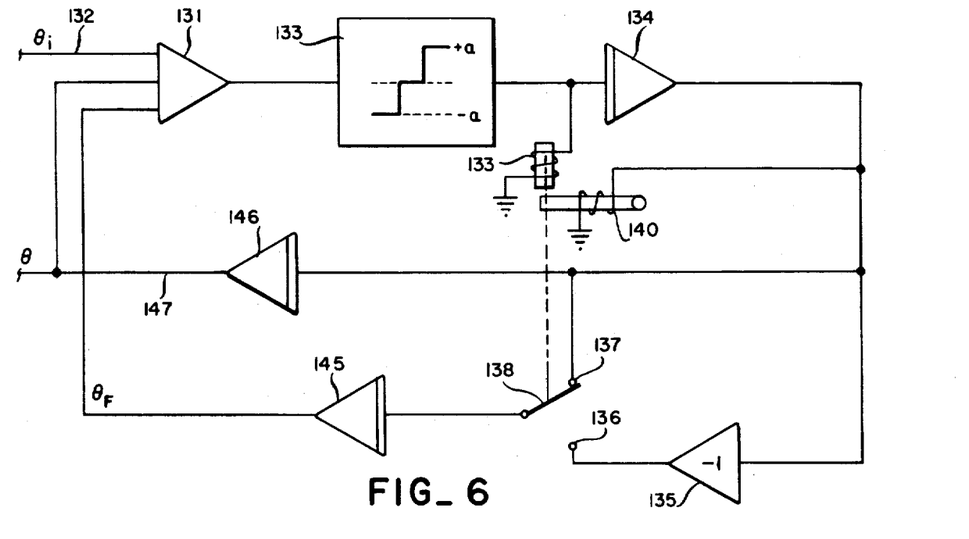
FIGS. 6 and 7 are block diagrams of simplified control systems according to the invention.

Referring to FIG. 6 there is shown a simplified circuit which will also function in accordance with the control laws previously stated. This circuit is similar to that in FIG. 1 but utilizes only one, instead of two, reversing amplifiers and employs no diodes. Instead, a special type of polarized relay is used, one whose polarization is produced by means of an electromagnet rather than a permanent magnet, and whereby the coil 133 which magnetizes the electromagnet is connected to the input of the integrator 134 and the coil 140 which magnetizes the armature is connected to the output of the integrator 134. Operation of the circuit of FIG. 6 is very similar to that of FIG. 1. With a positive step input, the output of the switching element 133 is at first positive and this results in both the input and the output of the integrator 134 to be at first positive. This causes arm 138 to move to contact 137 and both integrators 146 and 145 develop identical, positive voltages, representing the system output. Therefore, when one-half of the commanded step input is reached, the output of the adding amplifier 131 begins to turn negative which causes the switching element 133 to produce a negative output, indicating the beginning of the braking cycle. It also causes arm 138 to move to contact 136 and the integrator 145 now integrates the negative system rate, thereby keeping the output of the summing amplifier 131 slightly negative until system error and system rate simultaneously become zero.

With a negative step input the arm 138 also initially moves to contact 137. This is because in this case the input as well as the output of integrator 134 are both negative. That is to say, in the polarized relay, both the polarization and the armature magnetization have reversed their polarity as compared to the case of a positive step input. The integrators 146 and 145 again develop identical, but this time negative voltages, again representing system output and again opposing the now negative input voltage. When one-half of the commanded step input is reached, the output of switching element 133 changes sign from negative to positive thereby producing unequal signs of the two voltages entering the polarized relay. Therefore, the arm 138 moves from contact 137 to contact 136 at this time, causing the auxiliary feedback voltage to decay to zero and the output of the summing amplifier 131 to remain slightly positive until system error and system rate simultaneously have become zero.

Figure 7:
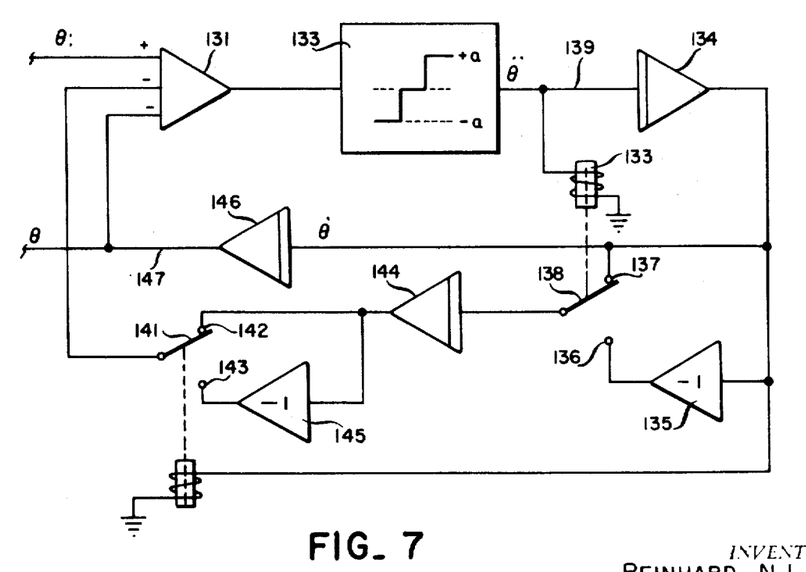

FIG. 7 shows still another embodiment of the attitude control system of the type previously shown in FIG. 1. The operation of this circuit, for the case of a positive step input, should be immediately clear from comparison with the circuit of FIG. 1. Since the system, while responding to a positive step input, will exhibit a positive angular rate the solenoid operating switch 141 will, during this time, be energized by a positive voltage which is the output of integrator 134 (integrator 8 of FIG. 1). With a negative step input, the difference between the two circuits will be readily apparent; whereas in the circuit of FIG. 1 all sign switching is done ahead of the integrator producing the auxiliary feedback voltage (integrator 17 of FIG. 1), in the circuit of FIG. 7, the basic sign switching of the auxiliary feedback voltage in response to the sign of the system rate is done downstream of the integrator which produces the auxiliary feedback voltage, 144. Thus, with a negative-step input, the time history of the auxiliary feedback voltage will be the same as for a positive step input, only reversed in sign. Note that the switching of contact 141 between 142 and 143 occurs only when system rate goes through zero, at which time in accordance with the previously set forth control laws (equation 6), the auxiliary feedback voltage is also zero. For this reason, the auxiliary feedback voltage will never experience a discontinuity as a consequence of the switching, as might be suspected on first inspection of the circuit FIG. 7.

As can be seen from the foregoing there has been shown and described a novel servo control system utilizing sign-switched integration. While these systems have been illustrated in embodiments particularly adapted to the reaction motor control systems of a spacecraft, it will be apparent to those versed in the art that these systems have a much wider range of applicability. Furthermore, it will be obvious to those versed in the art that certain changes may be made in the method and/or the apparatus of the invention without departing from the scope of the invention herein involved. Since it is understood that various omissions, and substitutions, and changes in the form and details of the devices illustrated, and in their operation, may be made by those skilled in the art, without departing from the spirit of the invention, it is intended that the invention be limited only as indicated by the scope of the following claims.

What is claimed is:

1. A closed-loop servo control system comprising:
   means for receiving a system input signal representing a desired state of a quantity to be controlled;
   means for providing a system output signal representing the actual measured state of said quantity to be controlled;
   first and second feedback signal circuit means, connected to said system input signal receiving means, carrying corresponding first and second feedback signals which are subtracted from said system input signal to produce an error signal, at the output of said system input receiving means, representing the difference between said desired state and the actual state of said quantity to be controlled;
   means for supplying said system output signal to said first feedback signal circuit;
   means for generating a signal representing a first time derivative of said quantity to be controlled;
   means for reversing the sign of said first time derivative signal;
   switching means having first and second operating conditions as determined by the magnitude and sign of said error signal; and, integrating means having an input for receiving the signal produced by said first time derivative generating means in response to the first operating condition of said switching means, for receiving the signal produced by said sign reversing means in response to the second operating condition of said switching means, and having its output connected to said second feedback signal circuit whereby said system input signal is modulated in a manner as to force said quantity to be controlled to approach said desired state.

2. A closed-loop servo control system as defined in claim 1 including:
second integrating means connected to the output of said first time derivative signal generating means to provide said first feedback signal.

3. A closed-loop servo control system as defined in claim 1 wherein said first and second feedback circuit means includes:
control means interposed between said first time derivative generating means and said first feedback signal circuit means for producing essentially a second time derivative of said quantity to be controlled.

4. A closed-loop servo control system as defined in claim 3 including:
means for changing the sign of the output of said first time derivative signal generating means to correspond to the sign of the second time derivative of said system output signal.

5. A time-switched integration servo system comprising:
an adder having first, second, and third input terminals and generating a sum signal at its output terminal;
a source of control voltage connected to said first input terminal for supplying a position command signal thereto;
switching means connected to said output terminal and responsive thereto to generate a fixed voltage having a sign corresponding to the sign of the summed output from said adder;
first integrator means having its input connected to said switching means and its output made to act upon said second input terminal, for integrating said fixed voltage to provide a velocity feedback voltage to said adder; and
second integrator means having its input connected to the output of said first integrator means and its output connected to said third input terminal, for integrating said velocity feedback voltage to provide an auxiliary feedback voltage to said adder, indicative of position.

6. A time-switched integration servo system as defined in claim 5 having:
sign changing means interposed between said first integrator means and said second integrator means, and responsive to said switching means to change the sign of the derivative of the position feedback voltage whenever the sum of said position feedback voltage and said auxiliary feedback voltage equals said command signal.

7. A time-switched integration servo system comprising:
an adding amplifier adapted to receive a command input and two feedback inputs, and to provide a summed output;

switching means responsive to said summed output for providing a fixed amplitude signal, the sign of which corresponds to the sign of said summed output, whenever the sum of said inputs exceeds a predetermined signal level above a deadband zone;
a first integrator connected to the output of said switching means for providing a time integral of said fixed amplitude signal;
a second integrator connected to the output of said first integrator for providing a signal to one of said feedback inputs;
first sign changing means for obtaining a signal from said first integrator which is of opposite sign;
a third integrator having its input controlled by said switching means for integrating the output of said first integrating means whenever said switching means is providing a positive amplitude signal and for integrating the output from said first sign changing means whenever said switching means is providing a negative amplitude signal; and
means connecting the output of said third integrator to said other feedback input.

8. A time-switched integration servo system as defined in claim 7 including:
first and second diodes, the anode of said first diode being connected to the output of said first integrator and the anode of said second diode being connected to the output of said first sign changing means, and the cathodes of both of said diodes being connected in common to produce a positive voltage equal in magnitude to the output of said switching means, regardless of the sign of the output of said switching means;
second sign changing means connected to said common cathodes of said diodes; and
control means for connecting the input of said third integrator to said common cathodes whenever the sign of said summed output is positive, and for transferring the input of said third integrator to the output of said second sign changing means whenever the sign of said summed output is negative.

9. A time-switched integration servo system comprising:
an adder having first, second and third input terminals and generating a sum signal at its output terminal;
a source of control voltage connected to said first input terminal for supplying a position command signal thereto;
first switching means connected to said summed output and responsive thereto to generate a signal voltage having a sign corresponding to the sign of the summed output from said adder;
first integrator means having its input connected to said first switching means for integrating said signal voltage;
second integrator means having its input connected to the output of said first integrator means and its output connected to said second input terminal to provide a feedback voltage to said adder;
third integrator means having its output connected to said third input terminal for supplying an auxiliary feedback voltage to said adder;
sign changing means having its input connected to the output of said first integrator means; and second switching means for connecting the input of said third integrator means to the output of said first integrating means whenever the sign of the output of said first integrating means equals the sign of the input of said first integrating means, and for connecting the input of said third integrator means to the output of said sign changing means whenever the sign of the output of said first integrating means is opposite to that of the input of said first integrating means.

10. A servo system comprising:

an adding amplifier having a command input, a feedback input, an auxiliary feedback input, and an output generating a sum signal;

switching means responsive to the sum signal of said adding amplifier and having two stable states dependent upon the sign of said sum signal and generating an output of predetermined magnitude;

a first integrating amplifier for integrating the summed output from said switching means;

a second integrating amplifier connected to the output of said first integrating amplifier for providing a feedback signal to said feedback input;

sign changing amplifier means connected to the output of said first integrating amplifier for providing a time integral signal of negative polarity;

a third integrating amplifier having its output connected to said auxiliary feedback input; and, control means responsive to said switching means for connecting the output of said first integrating amplifier to the input of said second integrating amplifier whenever the sign of said summed output is positive and for connecting the output of said sign changing amplifier to the input of said third integrating amplifier whenever the sign of said summed output is negative.

* * * * *